(12) United States Patent
Van Leeuwen

(10) Patent No.: US 8,232,731 B2
(45) Date of Patent: Jul. 31, 2012

(54) AUTOMATIC ADAPTATION OF SHED LIGHTING

(75) Inventor: Marcel Van Leeuwen, Maasdijk (NL)

(73) Assignee: Lely Patent N.V., Maassluis (NL)

( * ) Notice: Subject to any disclaimer, the term of this patent is extended or adjusted under 35 U.S.C. 154(b) by 447 days.

(21) Appl. No.: 12/510,305

(22) Filed: Jul. 28, 2009

(65) Prior Publication Data

US 2010/0019698 A1 Jan. 28, 2010

(30) Foreign Application Priority Data

Jul. 28, 2008 (NL) .................................. 1035772

(51) Int. Cl.
*H05B 37/02* (2006.01)
*H05B 39/04* (2006.01)
*H05B 41/36* (2006.01)

(52) U.S. Cl. ............ 315/156; 315/76; 315/84; 315/134; 315/157

(58) Field of Classification Search .................. None
See application file for complete search history.

(56) References Cited

U.S. PATENT DOCUMENTS

| 4,058,740 | A | * | 11/1977 | Dalton et al. ................. 307/116 |
| 4,367,455 | A | * | 1/1983 | Fried ............................. 340/6.11 |
| 5,969,637 | A | | 10/1999 | Doppelt et al. |
| 6,097,290 | A | * | 8/2000 | Balfour ....................... 340/545.1 |
| 7,397,342 | B2 | * | 7/2008 | Mullet et al. ................. 340/5.22 |

FOREIGN PATENT DOCUMENTS

| GB | 2432028 A | 5/2007 |
| NL | 1021636 C1 | 6/2004 |
| WO | 92/20959 A1 | 11/1992 |
| WO | 2004/075608 A2 | 9/2004 |
| WO | 2005/112613 A1 | 12/2005 |

* cited by examiner

*Primary Examiner* — Anh Tran
(74) *Attorney, Agent, or Firm* — Coraline J. Haitjema; David P. Owen; Hoyng Monegier LLP

(57) ABSTRACT

The invention relates to a method, a control system and a shed wherein the lighting is adjusted depending on the presence of an animal in a specific section of a shed. The shed is divided into a number of sections, for example a separation section. When no cows have access to the separation section and the section is therefore empty, the control system ensures that the lighting in the respective section is switched off. As the control system according to the invention controls both access to the section and lighting thereof, it is possible to dispense with movement sensors for controlling lighting in the respective sections.

18 Claims, 3 Drawing Sheets

| FIG. 3 | 20 | 14 | 14' | 7 | 3 |
|---|---|---|---|---|---|
| K 1. | X | | | | |
| K 2. | | X | | | |
| K 3. | X | | | | |
| K 4. | X | | | | |
| K 5. | X | | | | |
| K 6. | | | X | | |
| K 7. | X | | | | |
| K 8. | X | | | | |
| K 9. | | | | X | |
| K 10. | X | | | | |
| K 11. | X | | | | |

AUTOMATIC ADAPTATION OF SHED LIGHTING

This application claims priority from Netherlands application no. 1035772 filed on Jul. 28, 2008, the contents of which are hereby incorporated by reference in their entirety.

BACKGROUND OF THE INVENTION

1. Field of the Invention

The present invention relates to a method for the automatic adjustment of lighting in sections of a shed device, such as a separation zone. The invention also relates to a control system for a shed device having a number of sections for accommodating animals such as cows, in which a section, such as a separation zone, is provided with adjustable lighting. The invention furthermore relates to a device for keeping dairy animals having a plurality of sections.

2. Description of the Related Art

A shed device, for example having a plurality of production units, in which lactating dairy animals are kept, is known. A shed device for keeping dairy animals may be provided with a number of sections. Examples of such sections are first and second production units, as well as a care unit with a plurality of subunits. A section can also be part of a production unit. An example of a section in a production unit is a production unit which may be provided with at least an accommodation space for a production group of dairy animals which are at the lactation stage. The production unit may also be provided with a section with a milking device for milking the production group. The shed device may also be provided with a separation space, which is also a section.

A section can also be a subunit of the care unit, such as a calving unit for accommodating dairy animals during calving separately or a milking device for milking recently calved dairy animals or a sickbay unit for accommodating sick animals separately. The various sections, units or subunits can be in connection with one another. The connection is preferably a connection which can be walked on, such as a passageway. However, it may also be a connection between buildings.

The sections may be provided with an access device and/or exit device, preferably an access device/exit device which can stop a dairy animal, so that the dairy animal is kept in the present section or which can allow a dairy animal to change sections. The access device is preferably controllable. The access device may be connected to a control unit. The control unit is able to transmit a signal, referred to below as an access signal, to which the access device reacts and allows an animal access to a specific section. Thus, an animal can be given access or be barred from access to a specific section in a controlled manner. In particular, the access device/exit device cooperates with a sensor and an identification device which can be detected by the sensor and is provided on the dairy animal. A signal can be sent from the access device to the control unit. The control unit can process the identification signal and return an appropriate access signal to the access device, which then allows the identified animal access to the section determined by the control unit. The dairy animal which has been identified by the sensor near the access device can thus be given access to a specific section in accordance with a specific desired treatment. A control unit is connected to the sensors (which are positioned on or near the access device) and the access device/exit device and is arranged to control access of the animals to the sections in accordance with specific preferences. Control signals may be transmitted.

It is known that the milk production of dairy animals is influenced by the amount of light to which the dairy animal is exposed each day. In a covered shed device, lighting may be provided. The lighting may have an on/off switch, by means of which the lighting can be switched on or off. In another embodiment, the lighting is connected to a power supply. The power supply may comprise an adjustable switch which can interrupt the connection to the power supply.

It is known to use a sensor such as a movement sensor in order to detect the presence of a dairy animal in a specific section. When the sensor determines that there is no animal present in a specific section, the lighting can be switched off in order to save energy. WO 92/20959 describes a control unit for switching a lamp by means of movement sensors.

However, the fitting of suitable presence sensors in the various sections of a shed is expensive. In addition, there is a risk with presence sensors that the sensor performs an incorrect detection.

BRIEF SUMMARY OF THE INVENTION

It is an object of the present invention to reduce the costs of a shed device by means of adjustable lighting.

According to the invention, this object is achieved by providing a method for the automatic control of lighting in sections of a shed, in particular by means of a method for the automatic adjustment of lighting in sections of a shed device, such as a separation zone, comprising controlling the lighting, such as adjusting the lighting level of a lighting fixture, for example by adjusting the switching on and switching off of the lighting, in a specific section of the shed.

According to the invention, the method furthermore comprises allowing access to the specific section of the shed which is effected by means of an access signal. The access device can react to this access signal. The access signal can be provided and transmitted by a control unit and received by the access device. According to one embodiment, the lighting in this specific section will be controlled, in particular will be adjusted, depending on the granted access to the specific section. The access signal which indicates to which section access is granted, is used to control the lighting.

According to the invention, the adjustment of the lighting depends directly on the granted access to the respective section. Because the control of the lighting is, at least for one moment, made dependent on the granted access, the use of sensors for measuring the presence of a dairy animal in a specific section is no longer required. The lighting can be controlled independently from presence sensors, which may thus become superfluous. This also results in a simplification of the control unit of the lighting and to cost savings. Obviously, it is possible that the adjustment of the lighting depends on more factors. Time may be an important factor. In many cases, the lighting will be switched off, at least partially, during the night.

In order to allow a dairy animal access to a section, the dairy animal is first identified. The dairy animal may be provided with an identification tag. This can then be scanned or detected or measured in another way. Thus, it is possible to determine which dairy animal can be given access to a section. Preferably, granting access to a section takes place at a location where access to the sections can be controlled and where the dairy animal already has to be observed anyway, such as at the milking robot. Another embodiment comprises a receiving space where the dairy animal is received, and from which access is possible to two sections. Access to one section is closed.

In one embodiment, the milking robot can transmit the detection data of a dairy animal to the control system and can receive instructions from the control system to then grant the dairy animal access to a section. The detection of a dairy animal is in this case the trigger which prompts the control system to change the access to a section.

In one embodiment, the lighting is provided in the form of power-consuming lighting, such as lamps. In another embodiment, lighting is provided by means of sunlight. This lighting too can be controllable according to the invention by means of blackout screens. By means thereof, the section in question is prevented from heating up further on account of sunlight, for example when the screens are completely open and thus block the sunlight out completely.

Controlling the lighting according to the invention may comprise switching on the lighting, for example the moment that a dairy animal is given access to a section which until that moment was not lit. The method can, in addition, also comprise switching off of lighting, when the last dairy animal in a section leaves said section due to it being given access to a subsequent section. Control or adjustment of the lighting may furthermore comprise control of a lighting state of the lighting. Preferably, control of the lighting comprises dimming the lighting.

According to one embodiment of the invention, the method furthermore comprises establishing an occupancy rate of the section, based on the granted access. The granted access can be used to compile a table with an occupancy rate of the sections. Allowing access to a specific section results in an increase in the occupancy rate of this new section. The occupancy rate of the previous section decreases. In particular for a separation section, the occupancy rate will be zero or one and in particular for this separation section, cost savings can be achieved by the fact that a movement sensor is obsolete and/or the fact that the lighting can be switched off immediately after the animal(s) has/have left the section.

Preferably, an occupancy rate of a section equal to zero will lead to the lighting in said section being switched off. As soon as an occupancy rate of zero is reached, the power supply of the lighting can be switched off, resulting in a saving of energy.

In one embodiment, the adjustment of the lighting, and in particular the switching on or off will be carried out based on a condition, for example the expiration of a time period. When a dairy animal is granted access to a subsequent section, the animal will still be present in the previous section for some time. According to this embodiment, the light is not adjusted or switched off immediately.

The invention also relates to a control system for a shed device. The shed device preferably has a number of sections for accommodating animals such as cows, with at least one specific section, such as a separation zone, being provided with lighting. The lighting is preferably adjustable. The control system which is arranged to at least achieve one of the objects of the invention is connectable, preferably connected, to the lighting or to a power supply of the lighting or to another switch, in particular an on/off-switch, of the lighting, with the control system being arranged to grant access to the section to an animal and with the lighting of said specific section being adjustable by means of the control system, depending on the granted access. A control unit signal can be transmitted to the access device by the control system. The access device will allow access to a section according to the access signal. The access signal may, for example, identify the section to which access is granted.

In particular, the lighting state of the lighting in the section is adjustable. The control system is arranged to control the lighting of this specific section, depending on the granted access and in particular depending on the access signal. Thus, a control system is obtained which is capable of controlling the switching on/switching off/adjustment of the lighting without using sensors to measure the presence of the animals in the respective section. This results in significant cost savings. According to the invention, the access signal has a double function: on the one hand, it makes it possible to grant animals physical access to a section, on the other hand, the same signal is used for the adjustment and control of the lighting in said section.

The control system may be a computer. The computer may be arranged as a management system for the dairy animals, in particular for optimizing the milk production of said dairy animals. The management system may, on the basis of a specific condition, for example because a dairy animal is ill, separate the latter from the other animals by granting said animal access to a separate section.

Preferably, the control system is connectable, preferably connected, to a controllable access device of the section, wherein the control system controls the controllable access device depending on the granted access. The data from the control system can thus be used to control the lighting in at least one of the sections of the shed device.

In a preferred embodiment, the lighting is at least switchable between a switched-on state and a switched-off state, and the control system is arranged to switch the lighting between said switched-on and switched-off states. However, the invention can also comprise switching between two different lighting states.

In an advantageous embodiment, the control system has a memory, the memory comprising an occupancy rate file, wherein the granted access is stored in the occupancy rate file. Thus, the occupancy rate can be monitored. In one embodiment, the control system is arranged to switch off the lighting of a section when the occupancy rate file indicates that said section is empty.

In an advantageous embodiment, the control system comprises a dimmer which is connectable to the lighting. The dimmer may be a separate part of the control system. By means of the dimmer, it is possible to have intermediate steps for the states of lighting. The dimmer can make 50% lighting possible. In one embodiment, the control system provides power for the lighting and the control system can change the intensity of the lighting using the dimmer by increasing or decreasing the power supply by means of the dimmer.

In one embodiment, the control system is connectable, preferably connected, to an adjustable dimmer which is connected to the lighting, wherein the control system is arranged to control the dimmer. Thus, the control system can control the dimmer to reach a desired state with the result that the lighting operates at the desired level of intensity.

The invention also relates to a shed device comprising a number of sections for accommodating animals such as cows, in which at least a specific section, such as the separation section, has a controllable access device and a controllable lighting, in which the access device and the lighting are connected to the control system as described above. This results in a shed with sections, access to which and lighting of which are controlled by a control system depending on the granted access. It is no longer necessary to provide a presence sensor in each section in order to control the lighting in said section.

In one embodiment, the controllable access device has at least a position in which an animal has access to the section and a position in which access is blocked. This makes it possible to guide an animal to the section desired by the control system.

Preferably, the control system is also arranged to monitor the current location of an animal, wherein the control system is connected to detection units. These detection units can be fitted at the access point to a section. This may be a detection unit on a milking box. Thus, existing detection units can be used for the method and the system according to the invention.

In an advantageous embodiment, the access device may form part of a milking box. By guiding dairy animals to be separated to the separation section via an existing milking box, no separate access path from the first milking box to the separation section is required. This saves space and railings. It is thus also possible to guide dairy animals from a plurality of milking boxes to a single separation space.

In an advantageous embodiment, the milking box comprises a milking robot for automatically connecting teat cups to the teats of a dairy animal. Such a milking box can operate completely automatically and comprises an automatically operable entry and exit gate. These gates can therefore advantageously be used for automatically guiding a dairy animal to a second milking box.

Of course, in addition to the method and the system according to the invention, it remains possible for the lighting also to be controllable depending on the current location of the animal, which is measured.

Advantageously, all of the production units and the care unit are accommodated in a separate part of the building, more advantageously in separate buildings. The term part of the building is understood to mean a part of a building which has external walls on three sides, such as a wing, and a separate building is understood to mean a building having external walls on four sides. Any connecting parts, such as optionally covered and/or enclosed corridors, which occupy less than half of the respective side, and in particular less than a quarter of the side, are not considered here. The advantage of such separate building parts or buildings is that this ensures sufficient, in particular natural, ventilation of the interior space.

As mentioned above, the care unit comprises a plurality of subunits/sections. These can also, advantageously, be accommodated in separate buildings or parts of buildings, but preferably at least in separate spaces. Any risk of contamination is reduced if, in particular, the sickbay unit is housed in a separate building.

In an advantageous embodiment, at least one production unit comprises at least two sections with milking boxes, a clean access space which is separate from the accommodation space for access to the milking boxes, as well as at least one separation space for dairy animals which are to be separated from the production group, which separation space is separated from the production space and the access space. In particular, but not necessarily, the number of milking boxes is in this case greater than the number of separation spaces, i.e. for at least one section/access space the associated number of milking boxes is greater than the number of separation spaces, and a controllable passage is then provided between the milking boxes which is arranged to guide a dairy animal to be separated from a first milking box to the separation space via a second milking box.

Each of the spaces, milking boxes and units mentioned may be a section according to the invention. A section preferably has closable or controllable access device.

BRIEF DESCRIPTION OF THE DRAWINGS

The invention will be explained below with reference to the drawing, which shows non-limiting exemplary embodiments, and in which:

FIG. 3 shows an example of a table for the occupancy of sections.

DESCRIPTION OF ILLUSTRATIVE EMBODIMENTS

Figure 1:
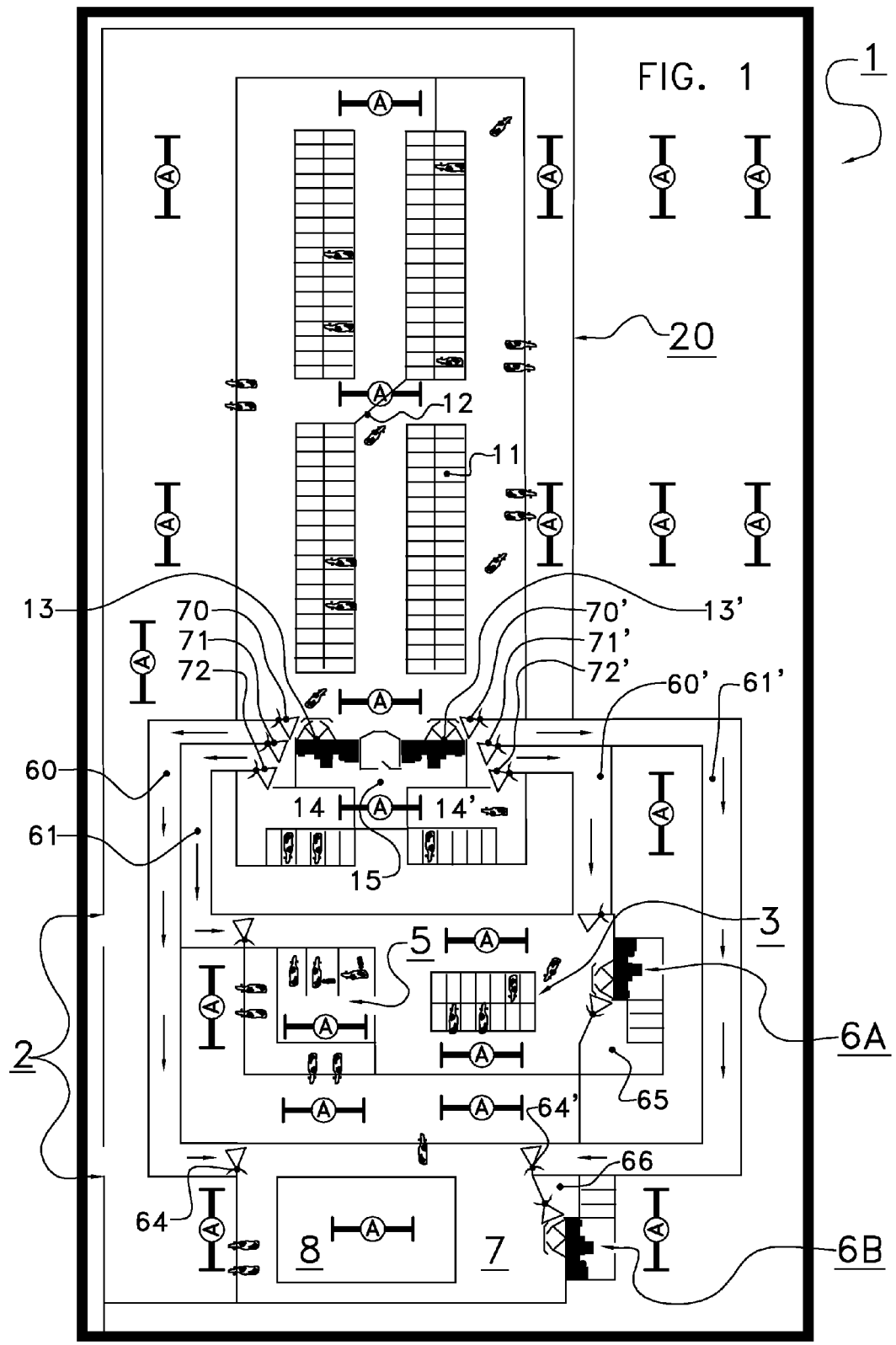
FIG. 1 diagrammatically shows an example of a shed device 1 according to the invention, in top view.

The following is a description of certain embodiments of the invention, given by way of example only and with reference to the drawings. FIG. 1 diagrammatically shows an example of a device 1 according to the invention, in top view, in which reference numeral 20 denotes a production unit and reference numeral 2 denotes a care unit.

The care unit 2 may comprise a non-lactation unit 3, a calving unit 4 and sickbay unit 7. The non-lactation unit 3 comprises boxes and feeding devices for the dairy animals, which are not shown in any more detail. In addition to a general space, the calving units 4 also comprise calving boxes 5, as well as a milking box 6a. The sickbay units 7 comprise, for example, a bed 8 and also a milking box 6b. The production unit 20 comprises boxes 11, a partition 12, a first and a second milking box 13, 13', a first and a second separation space 14 and 14', as well as a clean access space 15. Access to the clean space is possible via stairs (not shown).

It should be noted that the non-lactation units 3 do not necessarily form part of the care unit 2, since non-lactating dairy animals only require very little care, in practice hardly more than, preferably automated, feeding and the occasional inspection visit. For this reason, the non-lactation units 3 may even be provided furthest from the rest of the care unit 2. However, it may also be advantageous to provide the non-lactation unit as indicated in FIG. 1, in which case the distance to be travelled by the animal remains limited.

The calving unit 4 comprises calving boxes 5 for animals which have recently calved, as well as a general space for animals which are just about to calve. The purpose of the milking device provided in the milking box 6a is to milk mother animals which have recently calved. Firstly, colostrum can be collected in this way and given to the calves, and secondly, the milk production can be stimulated by a targeted milking regime. In addition, the animals require more attention and care during the calving period.

The sickbay units 7 comprise separated dairy animals, for example sick animals, wounded animals, animals which are too nervous or animals which require additional attention for other reasons, for example dairy animals with an irregular number of teats, etc. In order to give the care required by these animals, special beds 8 may be provided, etc. If desired, spaces may be provided which are isolated. The milking device which is also provided in the milking box 6b, could for example be provided with special, additional or more sensitive measuring equipment to monitor the animal's health and/or milk quality.

On the basis of the data of a dairy animal, for example temperature measurements on the teats, the milking robot 13,13' can determine whether a dairy animal has, for example, an inflamed teat. Other conditions of the dairy animal can also be determined from the measurement data. Based on the data, a decision can be made whether not to guide a dairy animal to the production unit 20, but instead separate it.

In one embodiment, a dairy animal is guided from the milking robot to the separation space 14,14', via access gate 70, and a farmer can then take the decision to isolate the animal further, for example in a sickbay section 7. The farmer can then accompany the dairy animal to said section. The dairy animal can leave the separation space via a gate (not shown) and enter the sickbay section 7 via a gate via the intermediate spaces shown around section 5. On the basis of measured data, such as milking data, but also on the basis of input data, for example data input by the user/farmer, the milking robot 13/13' and/or the control system connected thereto can decide that a dairy animal has to be given access to a non-lactation section 3. This can likewise take place via separation space 14,14', with the farmer accompanying the dairy animal to section 3.

The production unit 20 houses large numbers of dairy animals. If desired, these can be divided into two or more subgroups, for example with the aid of partition 12, which is only partly shown. Of course, at least one milking box 13, 13' with milking device should be provided for each subgroup, and advantageously at least two, so that dairy animals have at least one possibility of being milked, even in the event of a malfunction. Other, self-evident components have not been shown, such as milking lines which take the collected milk to storage tanks. Feeding devices, preferably automatic feeding devices, have not been shown either.

The production unit 20 comprises two milking boxes 13 with a milking device, as well as two sections, such as separation spaces 14, for example for animals which could not be milked or whose milk or behavior during milking indicates that they are sick. These animals can then, if necessary, be taken to the sickbay units 7. It is also possible for different numbers of milking robots to be provided, for example three or four per production unit. Each of the components of the production unit 20, including the milking box 13 itself, may be a section according to the present invention. According to one aspect of the invention, a section is a space to which access can be controlled.

The milking box 13,13' is in each case provided with a detection device for identifying the dairy animal. This detection is carried out in order to link the milking data to the animal. In a shed device, there may also be another unit by means of which animals are identified. The identification can be carried out in different ways. The identification data of the milking box 13,13' can be transmitted to a control system for managing access of dairy animals to specific sections. Thus, the control system can be enabled to control access of the dairy animals.

In the illustrated example, a separation section 14,14' is provided for each milking box 13,13', respectively. Thus, a simple control system suffices to guide a dairy animal to be separated to the separation space 14,14' instead of back to the accommodation space. To this end, the milking box 13,13' is provided with a gate 70, diagrammatically illustrated by a triangle. The gate forms the exit of the milking box 13,13', but as such also forms the access point to a section. The gate is controllable and thus the gate forms an access point to a section which is remotely controllable and by means of which a control system is able to give or refuse dairy animals access to a section.

It is advantageous to provide the separation section on an outer side of the production unit. Not only does this make it possible to reduce the risk of contamination for healthy animals in case of an infectious disease, but also the distance to be travelled is limited if an animal needs to be moved to a sickbay unit or the like.

In one embodiment, dairy animals are given direct access to a section by means of the access gates 70-72 in accordance with the decision of the management system. A dairy animal which has been identified in the milking box 13,13' can, by means of three access gates 70-72,70'-72', be guided back to the production unit 20, to the separation space 14,14', to a section with non-lactation units 3 and calving units 4, or to the sickbay section 7. Open connections to the various sections are in each case provided from the three access gates. In the illustrated embodiment, the corridors 60,61 to the sections 3,4,7 are relatively long. At the end of the corridor, near the section, a unidirectional gate 64,64' may be provided, so that a dairy animal cannot re-enter the corridor 60,61 from the separate section.

The access gates 70-72 are connectable or connected to a control system 30. The access gates can receive an access signal and upon receipt of said signal will grant an animal access to a specific section of a subsequent path. An access gate can give access to one, two, three or a number of sections.

Furthermore, a clean access space 15 is shown which gives access to the milking robots without an animal having to pass through the accommodation space of the production unit. The access space 15 can also serve as a further partition of the separation space 14, 14'.

The animals may be provided with an identification device, such as a barcode or a wirelessly determinable identification code. This identification device is detectable and a suitable sensor can be used to this end. Upon identification of an animal, an identification signal can be transmitted to a control system 30. Thus, access to a separation section 14 can be controlled in accordance with the program of the control system. When a cow to be separated is recognized at the milking box 13,13', the cow can be separated, after milking, by providing a separate exit for said cow, while the 'normal' exit/access point leading back to the production unit 20 remains closed. The control system 30 can transmit a suitable access signal to an access gate 70-72 in response to the identification signal.

Although in the illustrated embodiment, the milking box 13 is in each case used to control separation, it is possible to use a different device for this purpose. In another embodiment, an access gate with feed is provided in order to attract the animals, so that the gate is only opened for an animal to be separated.

When a dairy animal enters the milking robot 6a or 6b, the management system can decide, for example on the basis of measurement data based on the milk (production) of the dairy animal or on the basis of time or on the basis of an externally input parameter, that a dairy animal should return to the production unit 20. To this end, a controllable gate is provided which either returns the animals to the respective section or, on the contrary, gives access to section 65 of 66, from which a farmer can guide the recovered animal to the production unit.

In one embodiment, a dairy animal can be guided from separation spaces 14,14' to the sections 3,5,7 by the farmer instead of via the corridors.

Lighting is present in the various sections of the shed device 1 and is in each case denoted by an A. The lighting can also comprise a lighting fixture. It is advantageous if each of these lighting fixtures, for example light boxes can be switched between at least two lighting levels, preferably a plurality of levels. To this end, a separate switch may be provided. The switch may form part of the lighting fixture. In one embodiment, the lighting fixture comprises a dimmer. In one embodiment, the overall lighting can be dimmed by switching off one or more lighting fixtures A, as a result of which the total lighting level is reduced.

The control system 30 can transmit an access signal with which an animal is granted access to a specific section. The respective access gate or gates will make access possible. The access signal can also be used to control the lighting in this section, in particular to switch it on.

The switch and/or the dimmer may be remote-controlled. To this end, a connection can be established with the dimmer or switch. This may be a wired or a wireless connection. Via the connection, the dimmer or switch can be controlled and the lighting level of the lighting be controlled. This makes it possible to adjust the lighting level in sections of the shed device. In particular, this makes it possible to save energy, for example by switching off the lighting when there are no animals present in a specific section.

Figure 2:
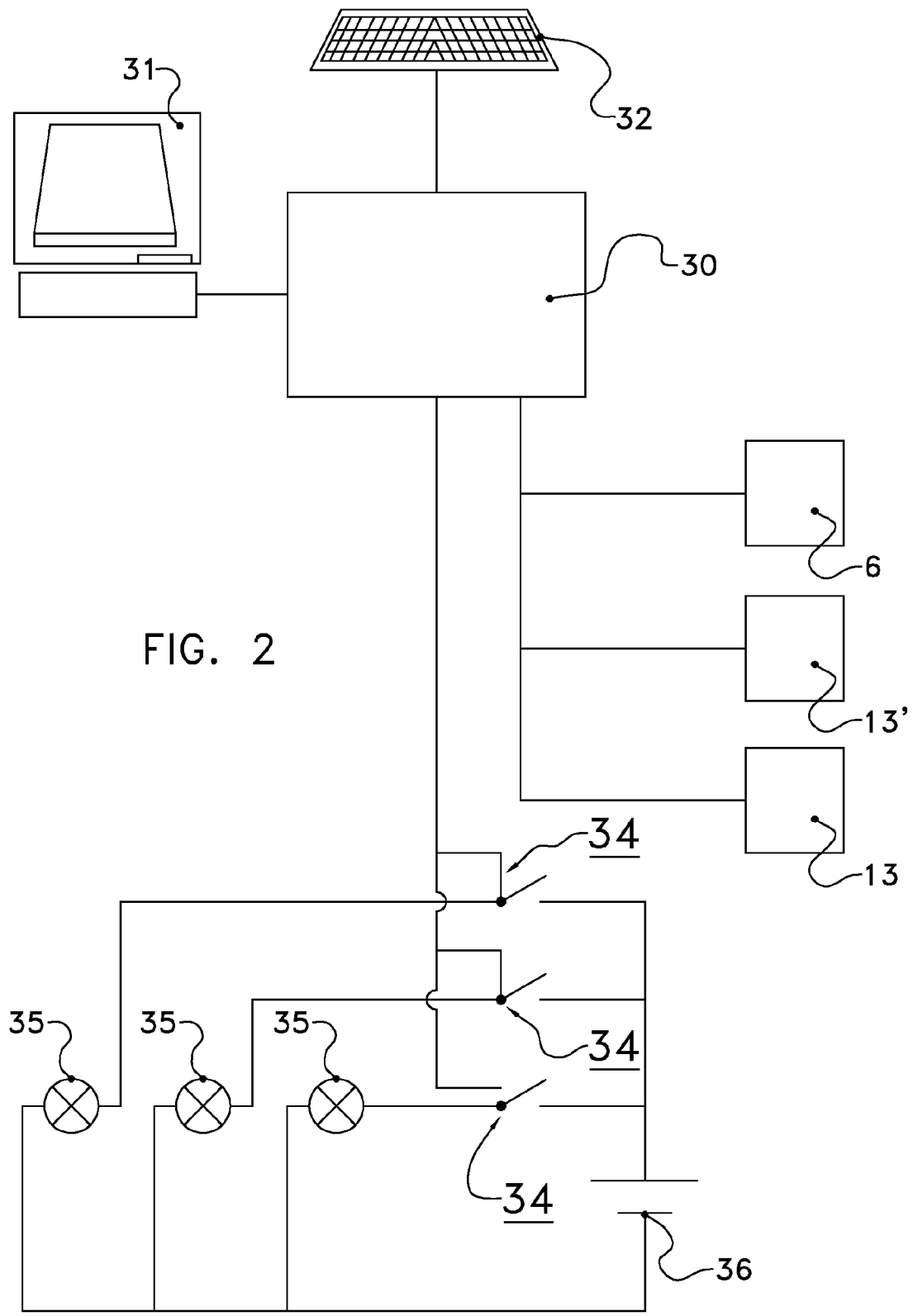
FIG. 2 diagrammatically shows an example of a control system 30 with connections.

The invention provides a control system 30, an embodiment of which is shown in FIG. 2. The control system is diagrammatically illustrated. The control system 30 may be a computer. The computer may be connected, via input and output ports, to external units such as a keyboard 32 or a display 31. This makes it possible to interact with the user, so that a user can monitor the current state of the system and/or input different settings.

By using the sensors on the milking robots 13,13', 6a and 6b, which are inevitably present, a dairy animal can be identified. These identification data can be sent to the control system 30.

In the illustrated embodiment, the control system 30 is connected to three switches 34. The switches 34 are incorporated in the respective circuits of three lighting fixtures 35, which are in each case connected to a power source 36. The lighting 35 is represented diagrammatically. One lighting fixture 35 can comprise a plurality of light sources. The lighting 35 may be a light box.

It will be clear to those skilled in the art that, according to the invention, the number of connections is flexible. It is also possible to use different switches 34. In addition, it is possible to use a dimmer instead of a switch 34. It is likewise possible for the switch 34 to be part of the lighting fixture. In yet another embodiment, the switch 34 forms part of the power supply 36.

According to the invention, it is in each case possible to adjust the light level of one or more lighting fixtures 35 in the shed device 1 by means of the control system 30.

In the illustrated embodiment, the control system 30 is also connected to the milking boxes 13,13' and 6a,6b according to the embodiment of FIG. 1. It will be clear to those skilled in the art that other connections are also possible. In particular, the control system 30 is connected to the exit of the milking box, which can give access to two or more sections.

When an animal is being milked in one of the milking robots 13,6, its identity is established. The animal can be returned to the production unit 20 by means of a signal from the management system which is incorporated in the control system 30 according to the invention. The animal can also be separated off by means of a suitable signal. The control system can monitor how many animals are being separated off. Thus, the control system can keep track of the occupancy rate for a section. Based on the occupancy rate, lighting can be switched on or switched off.

According to the invention, partly due to the use of the access gates 70-72, the control system can keep track of the current location of a dairy animal. Thus, no separate presence sensors are required in the sections in question to determine whether animals are present in said section in order then to switch the lighting on or off, in accordance with the result of the observation.

FIG. 3 shows an example of a table for the occupancy rate. The location of a number of cows K1-K11 is indicated. Cow K2 is in separation section 14, while cow K6 is in separation section 14'. Furthermore, cow K9 is situated in sickbay unit 7. The other cows are in the production unit 20.

FIG. 3 shows a table. It will be clear to those skilled in the art that various embodiments are possible for keeping track of and monitoring the location of the animals. In the first column of the table, the designation of the dairy animal is given. In the top row of the table, a section number (20,14,14'7,3) is indicated. An 'x' means that, according to said column, that dairy animal is present in the section. It is possible to define more sections. In the table, the section comprising the calving unit and non-lactation unit is denoted by a single figure, i.e. 3.

In the embodiment described above, the illustrated table can be displayed on the display 31 which is connected to the control system 30. The table is a representation of the occupancy. Based on the occupancy, an occupancy rate table can be compiled. The occupancy rate table based on FIG. 3 is as follows:

| Section | Number of dairy animals |
| --- | --- |
| 20 | 8 |
| 14 | 1 |
| 14' | 1 |
| 7 | 1 |
| 3/5 | 0 |

The occupancy rate can be given in the form of a table by the control system and can be incorporated into an occupancy rate file which is stored in a memory (not shown) of the control system 30. The file can be saved each time a change has occurred. The file can be updated following a specific choice by the management system. The location of the cow can be changed. If cow K1 is separated off to separation section 14, the cross for K1 in FIG. 3 in the column of production unit 20 will be removed and a cross will appear in the column of separation section 14. In the occupancy rate table in FIG. 3, the number of cows present in section 20 will decrease by one to seven and the number of cows present in section 14 will increase to two. In one embodiment, this does not affect the lighting settings.

In the example illustrated in the table from FIG. 3, no cows are present in the section comprising calving space 5/non-lactation space 3. According to the invention, the lighting can be switched off on the basis of this finding. The switching off can take place immediately after the last cow has left the space or a specific period later.

By using the selection at the milking boxes 13,13' and 6, the control system can immediately determine the position of a cow and the control system can control the lighting. If a farmer accompanies a dairy animal from the separation space 14/14' to the sections 3/5/7, the arrival of the dairy animal in the section can be recorded by means of a sensor which is present or can be announced by the farmer via a user interface. This procedure also serves to record that it has left the preceding section and to change the occupancy table accordingly.

When a cow is given access to the calving space, the lighting can be switched on. When the last cow K9 present in sickbay unit 7 is milked using the milking box 6b and said cow is then given access to the production unit 20 instead of being returned to the calving space, the lighting in the sickbay unit 7 can be switched off. In an advantageous embodiment, the light is already switched off after the cow K9 has entered the milking box 6.

It will be clear to those skilled in the art that the invention makes it possible to provide energy-efficient lighting without the significant costs involved with movement sensors in the respective sections of a shed device. Various embodiments are possible without departing from the scope of the invention. The scope of protection of the patent is only limited by the claims. Equivalent solutions which offer the same advantages or aspects of the same advantages, are also covered by the claims.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A method for the automatic control of lighting in sections of a shed comprising control of lighting in a specific section of the shed, the method comprising:
    granting access to the specific section of the shed by transmitting an access signal;
    controlling the lighting in the specific section depending on the access signal; and further comprising determining an occupancy rate of the sections based on the granted access.

2. The method according to claim 1, wherein controlling the lighting in the specific section comprises adjusting of the lighting level.

3. The method according to claim 2, wherein controlling the lighting in the specific section comprises adjusting the lighting state of the lighting.

4. The method according to claim 2, wherein controlling the lighting in the specific section comprises switching on the lighting and/or switching off the lighting.

5. The method according to claim 1, wherein an occupancy rate of a section which equals zero results in the lighting in the section being switched off.

6. The method according to claim 1, wherein controlling the lighting comprises providing a condition, and wherein the controlling takes place a specified time after said condition has been met.

7. The method according to claim 1, further comprising receiving animal identification data, and wherein transmitting the access signal depends on the animal identification data.

8. The method according to claim 7, further comprising detecting an identity of an animal using a detection device to generate the animal identification data.

9. A system for automatic control of lighting in sections of a shed, comprising:
    an access device for granting access to a specific section of the shed;
    a control device for controlling the lighting in the specific section depending on the access signal;
    a control system for transmitting an access signal to the access device, and for controlling the lighting in the specific section in dependence on the access signal; and
    wherein the control system has a memory, and wherein an occupancy rate file is incorporated in the memory, wherein the granted access is recorded in the occupancy rate file, and wherein the control system is arranged to switch off the lighting of a section if the occupancy rate file indicates that said section is empty.

10. The system according to claim 9, wherein the control system is adapted to receive animal identification data and transmit the access signal in dependence on the animal identification data.

11. The system according to claim 9, wherein the lighting is switchable between a switched-on state and a switched-off state, and wherein the control system is arranged to switch the lighting between the switched-on and switched-off states.

12. The system according to claim 9, wherein the control system comprises a dimmer which is connectable to the lighting.

13. The system according to claim 9, wherein the control system is connectable to an adjustable dimmer which is connected to the lighting.

14. The system according to claim 9, wherein the control system is also arranged to monitor a current location of an animal and wherein the control system is connected to detection units which are provided in at least one of the sections, wherein the detection units can detect the presence of a cow in a section.

15. The system according to claim 9, further comprising a detection device for transmitting animal identification data to the control system, and wherein the control system generates the access signal in dependence on the animal identification data.

16. The system according to claim 9, further comprising a milking box for transmitting animal identification data to the control system, and wherein the control system generates the access signal in dependence on the animal identification data.

17. A shed comprising a number of sections for accommodating animals such as cows, wherein at least one specific section is provided with lighting, wherein the lighting is connected to the control system according to claim 9.

18. The shed according to claim 17, wherein the section has an access device which is controllable and is connected to the control system.

* * * * *